(12) United States Patent
Nakamura

(10) Patent No.: US 10,486,349 B2
(45) Date of Patent: Nov. 26, 2019

(54) MANUFACTURING METHOD OF INSERT MOLDED ARTICLE

(71) Applicant: NAKANISHI METAL WORKS CO., LTD., Osaka-shi (JP)

(72) Inventor: Masayoshi Nakamura, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 400 days.

(21) Appl. No.: 15/492,664

(22) Filed: Apr. 20, 2017

(65) Prior Publication Data

US 2017/0305048 A1 Oct. 26, 2017

(30) Foreign Application Priority Data

Apr. 26, 2016 (JP) ................................. 2016-088114

(51) Int. Cl.
| | |
|---|---|
| *B29C 45/16* | (2006.01) |
| *B29C 45/14* | (2006.01) |
| *B29C 45/40* | (2006.01) |
| *B29C 33/12* | (2006.01) |
| B29L 15/00 | (2006.01) |
| B29K 105/00 | (2006.01) |
| B29K 705/00 | (2006.01) |
| F16H 55/06 | (2006.01) |

(Continued)

(52) U.S. Cl.
CPC ........ *B29C 45/1671* (2013.01); *B29C 33/123* (2013.01); *B29C 45/14065* (2013.01);
(Continued)

(58) Field of Classification Search
CPC .... B29C 45/14377; B29C 2045/14131; B29C 2045/14147; B29L 2015/003; F16H 2055/065
(Continued)

(56) References Cited

U.S. PATENT DOCUMENTS 3,200,665 A * 8/1965 Wells ...................... F16H 55/06
  74/446
4,580,757 A * 4/1986 Dobhan .............. B29C 45/1459
  249/88

(Continued)

FOREIGN PATENT DOCUMENTS

EP 0303113 A1 * 2/1989 ............. F16H 55/06
EP 0619445 A1 * 10/1994 ......... B29C 45/1671

(Continued)

*Primary Examiner* — Atul P. Khare
(74) *Attorney, Agent, or Firm* — Kratz, Quintos & Hanson, LLP

(57) ABSTRACT

The present invention is intended to provide a manufacturing method of an insert molded article that makes it possible to manufacture efficiently the insert molded article including a metallic insert, an inside member made of a synthetic resin and covering a portion of the insert, and an outside member made of a synthetic resin different from the material of the inside member and covering a portion of the inside member using general molding machines, not a dedicated two-color molding machine.

General molding machines are used to manufacture the insert molded article formed by injection molding of a resin part in twice. An insert core 7 is used in common in primary molding using a primary molding die C1 and in a secondary molding using a secondary molding die. A round shaft 7C of the insert core 7 is fitted into an internal hole 2C of an insert 2 to form a coupled body 10 in which the insert 2 and the insert core 7 are coupled together. The coupled body 10 is used in common at the primary molding step and the secondary molding step.

10 Claims, 8 Drawing Sheets

(51) Int. Cl.
  *B29C 45/26* (2006.01)
  *B29C 45/37* (2006.01)
  *B29K 105/12* (2006.01)
(52) U.S. Cl.
  CPC .. *B29C 45/14336* (2013.01); *B29C 45/14377* (2013.01); *B29C 45/162* (2013.01); *B29C 45/40* (2013.01); *B29C 45/1459* (2013.01); *B29C 45/1615* (2013.01); *B29C 45/2673* (2013.01); *B29C 45/37* (2013.01); *B29C 2045/14131* (2013.01); *B29C 2045/14147* (2013.01); *B29K 2105/0067* (2013.01); *B29K 2105/12* (2013.01); *B29K 2705/00* (2013.01); *B29L 2015/003* (2013.01); *F16H 2055/065* (2013.01)
(58) Field of Classification Search
  USPC .......................................... 264/261–263, 267
  See application file for complete search history.
(56) References Cited

U.S. PATENT DOCUMENTS

| | | | | |
|---|---|---|---|---|
| 4,581,806 A | * | 4/1986 | Minoshima | B29C 45/14336 264/156 |
| 5,728,343 A | * | 3/1998 | Ueno | B29C 45/1459 264/242 |
| 6,338,812 B1 | * | 1/2002 | Ogura | B29C 45/14467 264/254 |
| 6,988,582 B2 | * | 1/2006 | Kitami | B62D 5/0409 180/444 |
| 6,993,993 B2 | * | 2/2006 | Konishi | F16H 55/06 74/446 |
| 8,795,569 B2 | * | 8/2014 | Oberle | F16H 55/06 264/261 |
| 9,205,611 B2 | * | 12/2015 | Oolderink | B29C 37/0082 |
| 2002/0078777 A1 | * | 6/2002 | Witucki | B29C 45/1671 74/461 |
| 2003/0209829 A1 | * | 11/2003 | Brown, Jr. | B29C 45/0025 264/250 |
| 2008/0219607 A1 | * | 9/2008 | Murao | B29C 45/0046 384/417 |

FOREIGN PATENT DOCUMENTS

| | | | | |
|---|---|---|---|---|
| JP | 55063054 A | * | 5/1980 | ............ F16H 55/12 |
| JP | S58-128563 A | | 8/1983 | |
| JP | 2002-333059 A1 | | 11/2002 | |
| JP | 2004052791 A | * | 2/2004 | |
| JP | 2005022368 A | * | 1/2005 | |
| WO | WO-2015119143 A1 | * | 8/2015 | ......... B29C 45/1671 |

* cited by examiner

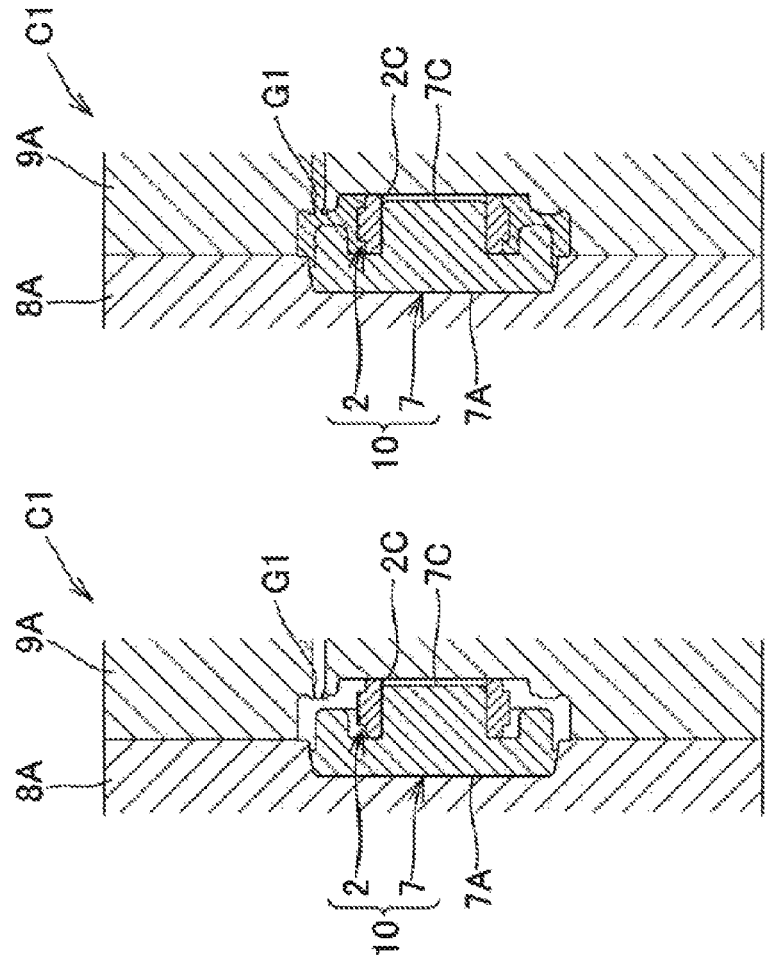

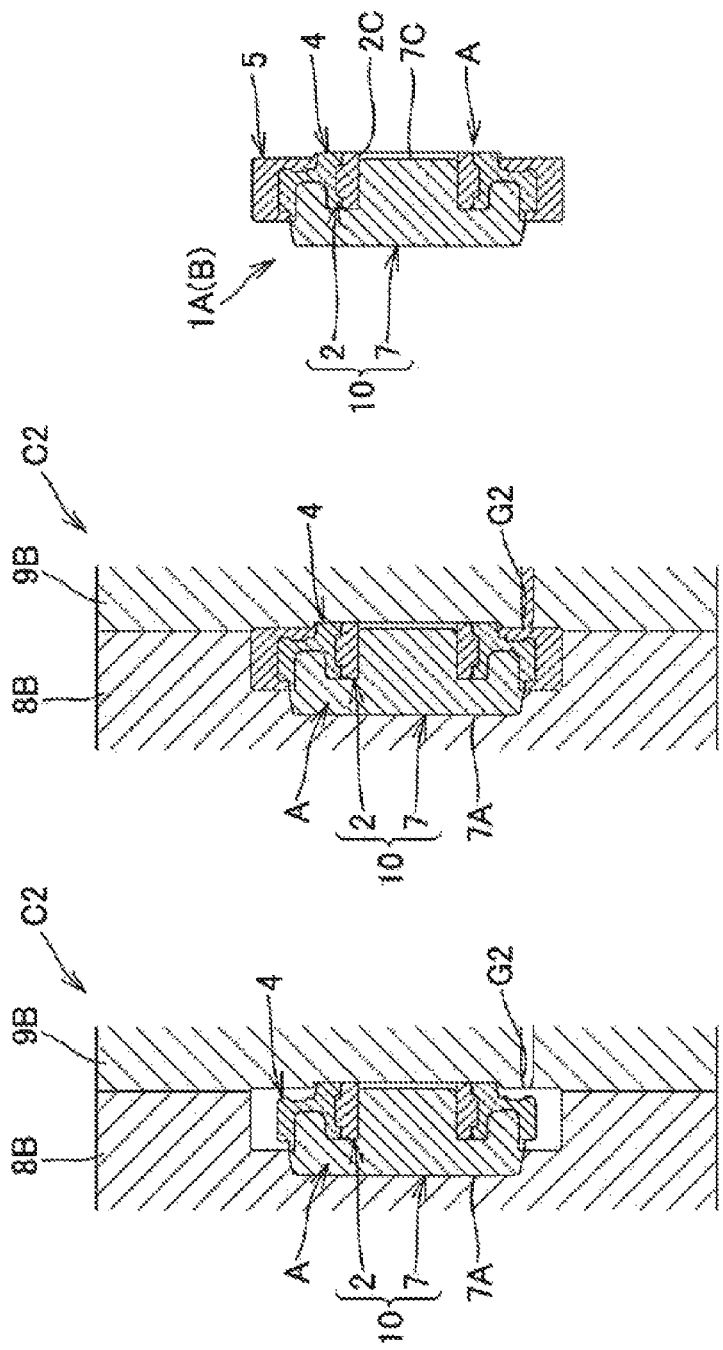

MANUFACTURING METHOD OF INSERT MOLDED ARTICLE

TECHNICAL FIELD

The present invention relates to a manufacturing method of an insert molded article that includes a metallic insert, an inside member made of a synthetic resin and covering a portion of the insert, and an outside member made of a synthetic resin different from the material of the inside member and covering a portion of the inside member.

BACKGROUND ART

As an insert molded article, there is a resin gear with metallic core in which a metallic gear has a part with teeth formed from a synthetic resin to engage with another gear, that is, a metallic sleeve as a metallic core and a synthetic resin tooth part covering the outer periphery of the metallic sleeve to make a power transmission gear lower in weight and noise level.

For further weight reduction, some of the resin gears with metallic core have the tooth part composed of an external member with teeth to engage with another gear (a gear main body in Patent Document 1, a resin part formed from a resin by the second molding in Patent Document 2) and an internal member (an annular member in Patent Document 1, a resin part formed by the first molding in Patent Document 2) positioned between the outer periphery of the sleeve (bush) and the external member (for example, refer to Patent Documents 1 and 2).

These conventional resin gears with metallic core are manufactured by forming the internal member with the metallic sleeve as an insert by injection molding (primary molding), and then forming the external member in another cavity die by injection molding (secondary molding) as illustrated in FIG. 4 of Patent Document 1, for example.

Alternatively, the conventional resin gears with metallic core are manufactured by forming the internal member with the metallic sleeve as an insert by injection molding (primary molding), then removing an integrated object of the metallic sleeve and the resin part from the die, and then loading the object into another die and forming the external member by injection molding (secondary molding) as described in Patent Document 2.

CITATION LIST

Patent Literature

Patent Document 1: JP-A No. 2002-333059
Patent Document 2: JP-A No. S58-128563

SUMMARY OF INVENTION

Technical Problem

In a general two-color molding method, a dedicated two-color molding machine including a common movable die, a fixed die for use in the primary molding, and a fixed mold for use in the secondary molding is used to perform molding while automatically exchanging the fixed dies between the primary molding and the secondary molding.

In the case of using such a dedicated two-color molding machine for manufacture of a resin gear with metallic core by injection-molding the resin part in twice, a plurality of dies is included in the same molding machine and the primary molding and the secondary molding are performed while the basic die is being rotated, for example, and therefore the product quality is stable due to fewer variations in the molding cycle.

However, the dedicated two-color molding machine is a special molding machine with complicated dies and driving mechanism, and is high in introduction cost and less in versatility. Moreover, the two-color molding dies for molding the resin gear with metallic core need to have special structures and are very difficult to fabricate.

In contrast, in the case of using two general molding machines for manufacture of the resin gear with metallic core by injection-molding the resin part in twice, the general molding machines are low in introduction cost and high in versatility. In addition, the primary molding die and the secondary molding die for molding the resin gear with metallic core need no special structures and are easy to fabricate.

However, when the primary molded article is removed from the injection molding machine for primary molding, the annular metallic sleeve and thinned portions of the resin part formed for weight reduction are deformed under influence of mold shrinkage or the like to change the dimensions of the primary molded article. It is difficult to position the primary molded article changed in the dimensions in the die of the injection molding machine for secondary molding, and there is a fear about further occurrence of deformation and breakage in the secondary molding.

Further, for stable supply of the primary molded articles, it is necessary to control the deformation of the primary molded articles due to shrinkage, the temperature, and the water absorption conditions. Accordingly, it is very difficult to stabilize the mass production quality and improve the yield.

Under the foregoing circumstances, an object of the present invention to solve the foregoing problems is to provide a manufacturing method of an insert molded article that makes it possible to manufacture efficiently the insert molded article including a metallic insert, an inside member made of a synthetic resin and covering a portion of the insert, and an outside member made of a synthetic resin different from the material of the inside member and covering a portion of the inside member using general molding machines, not a dedicated two-color molding machine.

Solution to Problem

To solve the foregoing problems, a manufacturing method of an insert molded article according to the present invention is a manufacturing method of an insert molded article including: a metallic insert; an inside member made of a synthetic resin and covering a portion of the insert; and an outside member made of a synthetic resin different from the material of the inside member and covering a portion of the inside member, in which an insert core to be commonly used in primary molding using a primary molding die and secondary molding using a secondary molding die is included. The manufacturing method includes the steps of: fitting the insert core into the insert to obtain a coupled body in which the insert and the insert core are coupled; positioning a base body of the insert core in the primary molding die to set the coupled body in the primary molding die, closing the primary molding die, injecting a molten resin for primary molding into a cavity of the primary molding die for injection molding of the inside member, thereby manufacturing a primary molded article in which the inside member is integrated into the insert; opening the primary molding die and removing the insert core and the primary molded article; positioning the base body of the insert core in the secondary molding die to set the insert core and the primary molded article in the secondary molding die, closing the secondary molding die, injecting a molten resin for secondary molding into a cavity of the secondary molding die for injection molding of the outside member, thereby manufacturing a secondary molded article in which the outside member is integrated into the primary molded article; opening the secondary molding die and removing the insert core and the secondary molded article; and separating the insert core from the coupled body as the secondary molded article.

In a preferable embodiment, the insert is an annular sleeve, the inside member is an annular internal member, the outside member is an annular external member, the insert molded article is a resin gear with metallic core having teeth formed on the outer peripheral surface of the annular external member, the base body of the insert core is disc-shaped, and a round shaft in a radially central portion of the base body is fitted into an internal hole of the annular sleeve.

According to the manufacturing method of an insert molded article as described above, a two-color molding machine as a special molding machine is not used but a first injection molding machine including a primary molding die and a second injection molding machine including a secondary molding die are used for injection molding of the resin part in twice. Alternatively, in the case of small-lot production, one injection molding machine is used to perform the primary molding using the primary molding die and the secondary molding using the secondary molding die while exchanging the dies and the resin materials. Accordingly, the use of the general molding machines suppresses increase in introduction cost and provides high versatility to facilitate the fabrication of the dies.

According to such the manufacturing method of an insert molded article, the coupled body formed by fitting and coupling the insert core to the metallic insert is used in common at the primary molding step using the primary molding die and the secondary molding step using the secondary molding die. This makes it possible to suppress the deformation of the primary molded article removed from the primary molding die after the primary molding step due to the influence of mold shrinkage and the like.

Moreover, the base body of the insert core used in common at the primary molding step and the secondary molding step is positioned in the primary molding die and the secondary molding die, which allows the positioning of the insert in the primary molding die and the positioning of the primary molded article in the secondary molding die in an easy and reliable manner.

Accordingly, at the manufacture of the insert molded article by injection molding of the resin part in twice, it is possible to stabilize mass-production quality and improve yield while suppressing a rise in manufacturing costs partly because the dies can be fabricated without using a special molding machine and the deformation of the primary molded article under the influence of mold shrinkage and the like can be suppressed.

More preferably, the insert core includes convex portions projecting toward the inside member to provide thinned portions to the inside member.

According to such the manufacturing method, the inside member can be easily provided with the thinned portions by the convex portions in the insert core. The provision of the thinned portions reduces the weight of the insert molded article. In addition, the molded article becomes smaller in volume to bring about a shorter hardening time. As a result, it is possible to shorten the molding cycle and decrease the amount of shrinkage to suppress sink marks, voids, and others.

Moreover, the convex portions in the insert core are inserted into the thinned portions formed in the internal member at the primary molding step, and the convex portions in the insert core remain in the thinned portions until the start of the separation step after the secondary molding step.

Accordingly, it is possible to suppress the deformation of the thinned portions in the primary molded article removed from the first injection molding machine after the primary molding step under the influence of mold shrinkage and the like.

Advantageous Effects of Invention

According to the manufacturing method of an insert molded article in the present invention as described above, the following advantages are produced:

(1) A two-color molding machine as a special molding machine is not used for injection molding of the resin part in twice, which suppresses increase in introduction cost and provides high versatility to facilitate the fabrication of the dies;

(2) The coupled body formed by fitting and coupling the insert core to the metallic insert is used in common at the primary molding step using the primary molding die and the secondary molding step using the secondary molding die. This makes it possible to suppress the deformation of the primary molded article removed from the primary molding die after the primary molding step due to the influence of mold shrinkage and the like;

(3) The base body of the insert core is positioned in the primary molding die and the secondary molding die, which allows the positioning of the insert in the primary molding die and the positioning of the primary molded article in the secondary molding die in an easy and reliable manner; and (4) From the advantages (1) to (3), at the manufacture of the insert molded article by injection molding of the resin part in twice, it is possible to stabilize mass-production quality and improve yield while suppressing a rise in manufacturing costs.

BRIEF DESCRIPTION OF DRAWINGS

FIG. 6(a) is a vertical cross-sectional view of the state in which the coupled body illustrated in FIG. 5(b) is set in the primary molding die and the molding die is closed, FIG. 6(b) is a vertical cross-sectional view of the state in which a molten resin for primary molding is injected into the primary molding die, and FIG. 6(c) is a vertical cross-sectional view of the primary molded article and the insert core removed from the opened primary molding die;

FIG. 7(a) is a vertical cross-sectional view of the state in which the primary molded article and the insert core illustrated in FIG. 6(c) are set in the secondary molding die and the molding die is closed, FIG. 7(b) is a vertical cross-sectional view of the state in which a molten resin for secondary molding is injected into the secondary molding die, and FIG. 7(c) is a vertical cross-sectional view of the secondary molded article and the insert core removed from the opened secondary molding die.

DESCRIPTION OF EMBODIMENTS

Next, embodiments of the present invention will be described in detail with reference to the accompanying drawings. The present invention is not limited to the embodiments illustrated in the accompanying drawings but includes all embodiments satisfying the requirements described in the claims.

The direction of a rotation axis of a resin gear with metallic core 1 here refers to "axial direction," and "radial direction" and "peripheral direction" are defined with respect to an axial core of the rotation axis.

Figure 1:
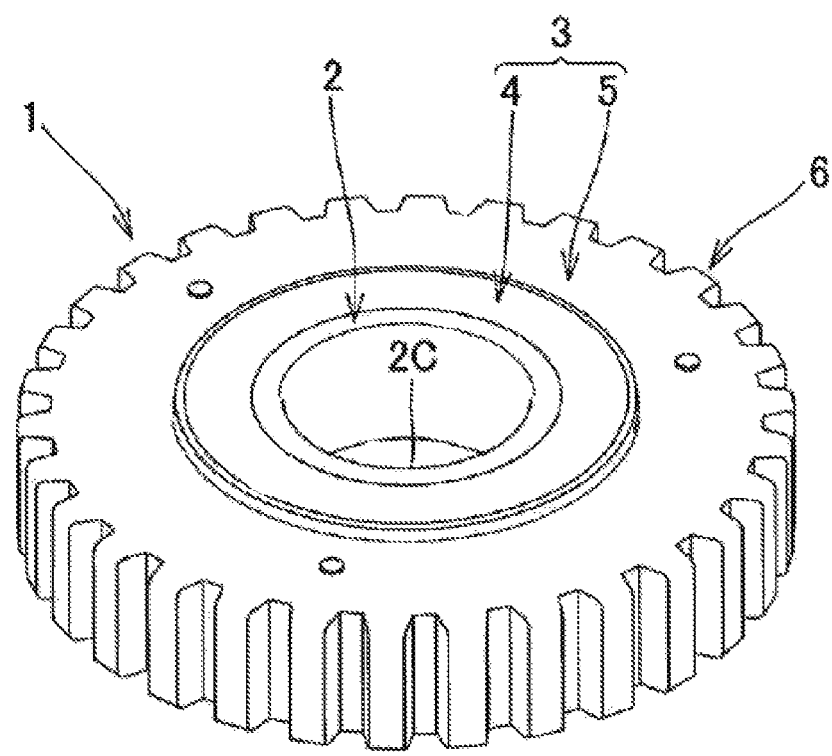
FIG. 1 is a perspective view of a resin gear with metallic core manufactured by a manufacturing method of an insert molded article according to an embodiment of the present invention.

The resin gear with metallic core 1 as an insert molded article manufactured by a manufacturing method of an insert molded article according to an embodiment of the present invention illustrated in the perspective view of FIG. 1 is used as a worm wheel of a worm gear for use in electric power steering, for example. The resin gear with metallic core 1 includes an annular sleeve 2 as a metallic insert, an annular internal member 4 as a synthetic resin inside member that covers a portion of the annular sleeve 2, and an annular external member 5 as a synthetic resin outside member that covers a portion of the annular internal member 4.

The annular internal member 4 and the annular external member 5 constitute an annular tooth part 3 that covers the outer peripheral surface of the annular sleeve 2 as a metallic core, and the annular tooth part 3 (the annular external member 5) has teeth 6 on the outer peripheral surface to engage with another gear.

The resin gear with metallic core 1 has the annular tooth part 3 made of a synthetic resin and can be significantly reduced in weight on the whole than metallic gears.

The internal member 4 is made of a synthetic resin fortified with a reinforcing material such as glass fiber or the like, the external member 5 is made of a synthetic resin not fortified with the reinforcing material, for example, and the internal member 4 and the external member 5 are different in material from each other.

Figure 2A:
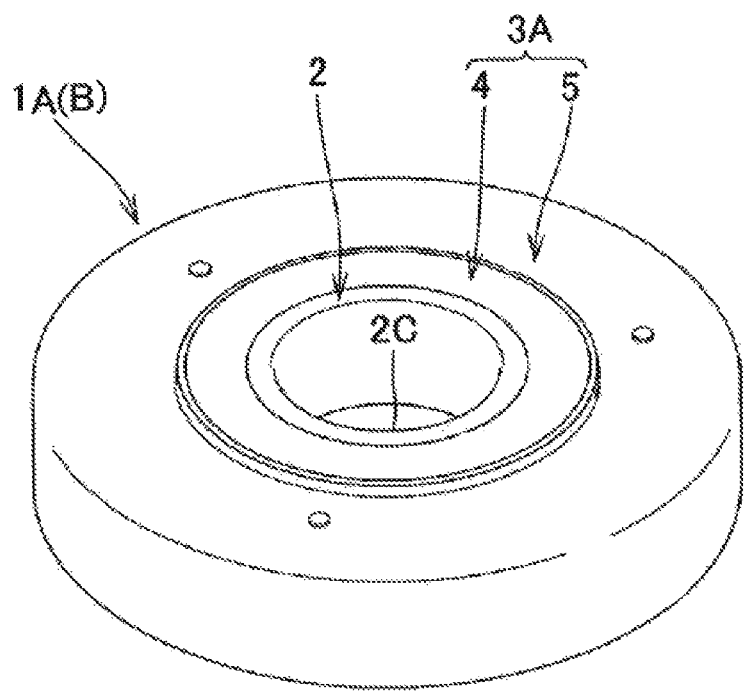
FIG. 2(a) is a perspective view of the resin gear with metallic core before formation of teeth to engage with another gear on the outer peripheral surface as a secondary molded article manufactured at a secondary molding step.
Figure 2B:
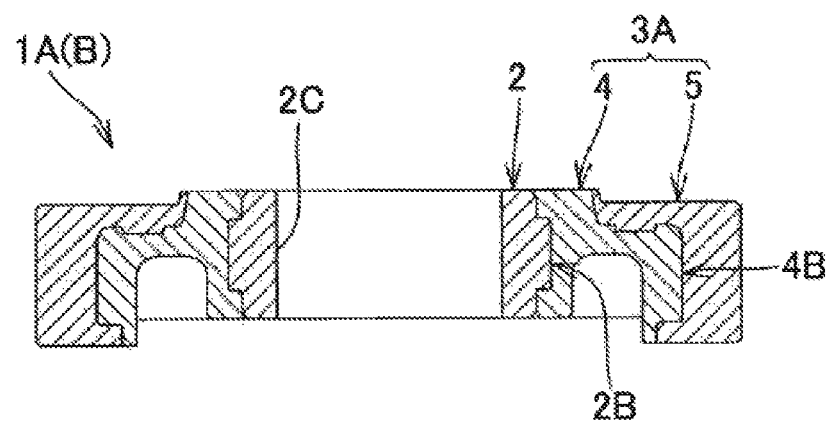
FIG. 2(b) is a vertical cross-sectional view of the same.

A secondary molded article B manufactured by the manufacturing method of an insert molded article according to an embodiment illustrated in the perspective view of FIG. 2(a) and the vertical cross-sectional view of FIG. 2(b) is a resin gear with metallic core 1A before formation of the teeth 6 on the outer peripheral surface. The resin part of the secondary molded article B is an annular tooth part 3A before formation of the teeth 6 on the outer peripheral surface.

The teeth 6 illustrated in FIG. 1 are formed on the outer peripheral surface of the annular tooth part 3A (the external member 5) by mechanical processing such as tooth cut processing. The teeth 6 may be formed in the process of forming the secondary molded article B by injection molding.

Figure 3A:
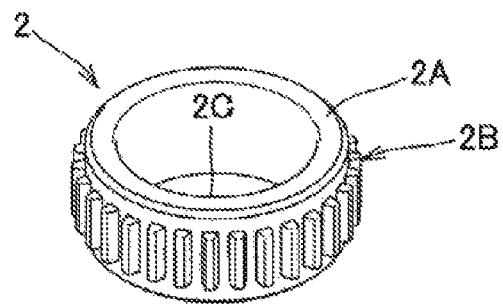
FIG. 3(a) is a perspective view of a metallic core as an insert.

As illustrated in the perspective view of FIG. 3(a), the annular sleeve 2 includes tooth-shaped projections (concaves and convexes) 2B on the outer peripheral surface of a base body 2A and has an internal hole 2C as a fit concave portion.

Figure 3B:
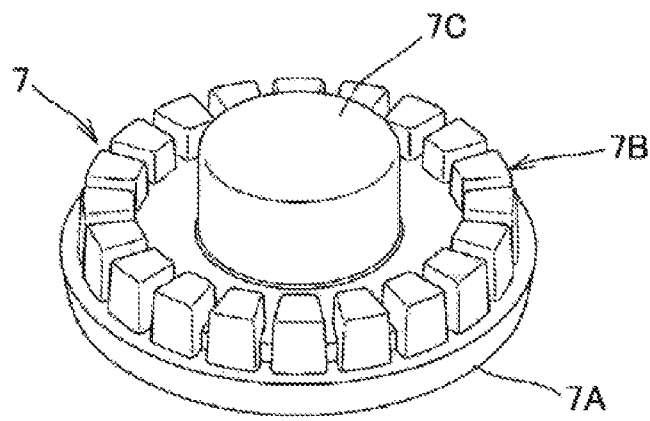
FIG. 3(b) is a perspective view of an insert core.

As illustrated in the perspective view of FIG. 3(b), an insert core 7 has a disc-shaped base body 7A, and axially projecting convex portions 7B are peripherally aligned on the outer side of the base body 7A, and the base body 7A has at a radially central part a round shaft 7C as a fitting convex part to fit into the internal hole 2C of the annular sleeve 2.

Figure 3C:
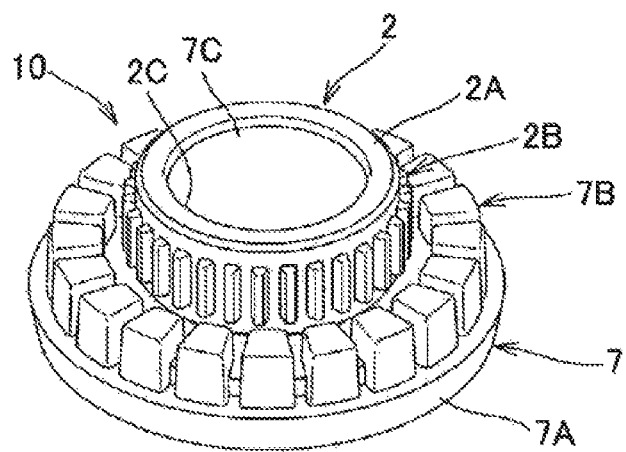
FIG. 3(c) is a perspective view of a coupled body in which the insert core is fitted into the metallic core.

Accordingly, the round shaft 7C of the insert core 7 can be inserted and fitted into the internal hole 2C of the annular sleeve 2 to obtain a coupled body 10 in which the annular sleeve 2 and the insert core 7 are coupled together as illustrated in the perspective view of FIG. 3(c).

Next, the manufacturing method of the resin gear with metallic core 1 according to an embodiment of the present invention will be described.

In the manufacturing method of the resin gear with metallic core 1, a dedicated two-color molding machine is not used but two general molding machines, that is, a first injection molding machine including a primary molding die and a second injection molding machine including a secondary molding machine, are used.

In addition, the insert core 7 is used in common in the primary molding using the primary molding die and in secondary molding using a secondary molding die. That is, when being removed from the primary molding die, the insert core 7 is coupled to the primary molded article A as illustrated in the perspective view of FIG. 4(a), and when being removed from the secondary molding die, the insert core 7 is coupled to the secondary molded article B as illustrated in the perspective view of FIG. 4(b).

Figure 4A:
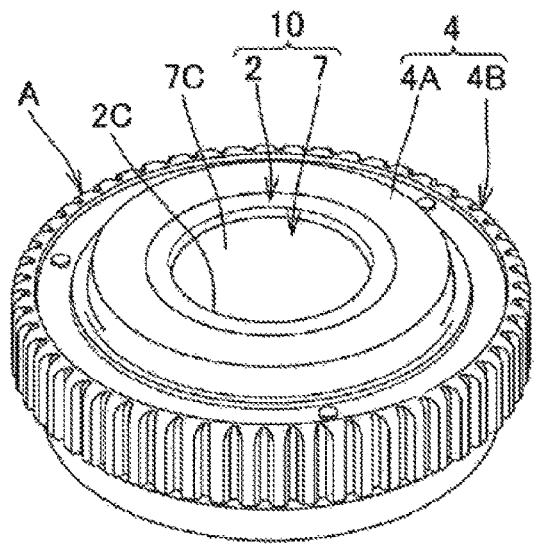
FIG. 4(a) is a perspective view of the state in which a primary molded article manufactured at a primary molding step is removed together with the insert core from a primary molding die.

In the primary molded article A illustrated in FIG. 4(a), the annular internal member 4 includes the tooth-shaped projections (concaves and convexes) 4B on the outer peripheral surface of the base body 4A.

<Coupling Step>

Figure 5A:
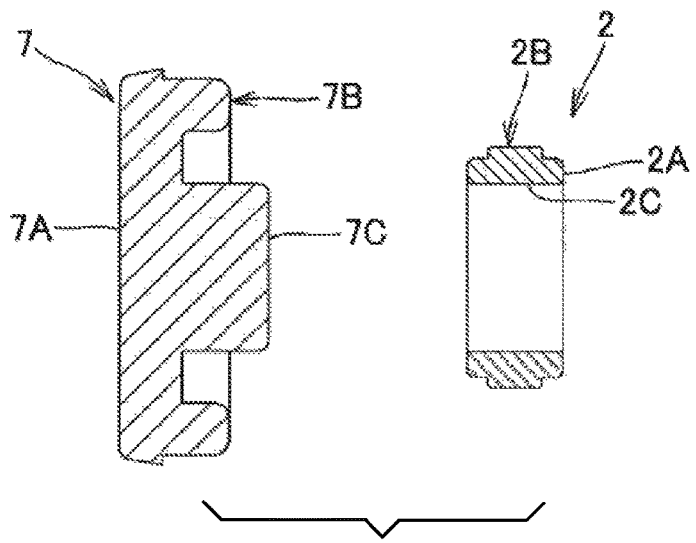
FIG. 5(a) is a vertical cross-sectional view of the metallic core and the insert core in the separated state.
Figure 5B:
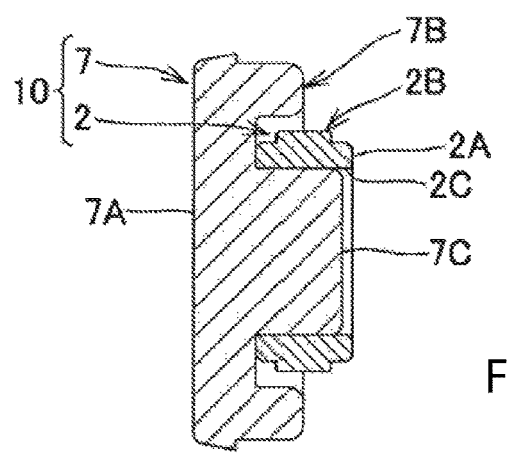
FIG. 5(b) is a vertical cross-sectional view of the coupled body in which the insert core is fitted into the insert core.

As illustrated in the perspective views of FIGS. 3(a) and 3(b) and the vertical cross-sectional view of FIG. 5(a), the annular sleeve 2 and the insert core 7 separated from each other are fitted together by inserting the round shaft 7C into the internal hole 2C to form the coupled body 10 illustrated in the perspective view of FIG. 3(c) and the vertical cross-sectional view of FIG. 5(b).

<Primary Molding Step>

As illustrated in the vertical cross-sectional views of FIGS. 6(a) and 6(b), the primary molding die C1 includes a movable die 8A and a fixed die 9A.

As illustrated in FIG. 6(a), the base body 7A of the insert core 7 is positioned in the movable die 8A of the primary molding die C1, the coupled body 10 is set in the primary molding die C1, and the primary molding die C1 is closed.

Next, as illustrated in FIG. 6(b), a molten resin for primary molding is injected from a gate G1 into the cavity of the primary molding die C1 to form the annular internal member 4 by injection molding.

<Primary Molded Article Removal Step>

After cooling the primary molding die C1 illustrated in FIG. 6(b) and hardening the resin, the primary molding die C1 is opened and the insert core 7 and the primary molded article A illustrated in the perspective view of FIG. 4(a) and the vertical cross-sectional view of FIG. 6(c) are removed from the first injection molding machine. The primary molded article A is formed by integrating the annular internal member 4 into the annular sleeve 2.

<Secondary Molding Step>

As illustrated in the vertical cross-sectional views of FIGS. 7(a) and 7(b), the secondary molding die C2 includes a movable die 8B and a fixed die 9B.

As illustrated in FIG. 7(a), the base body 7A of the insert core 7 is positioned in the movable die 8B of the secondary molding die C2, the insert core 7 and the primary molded article A are set in the secondary molding die C2, and the secondary molding die C2 is closed.

Next, as illustrated in FIG. 7(b), a molten resin for secondary molding is injected from a gate G2 into the cavity of the secondary molding die C2 to form the annular external member 5 by injection molding.

<Secondary Molded Article Removal Step>

Figure 4B:
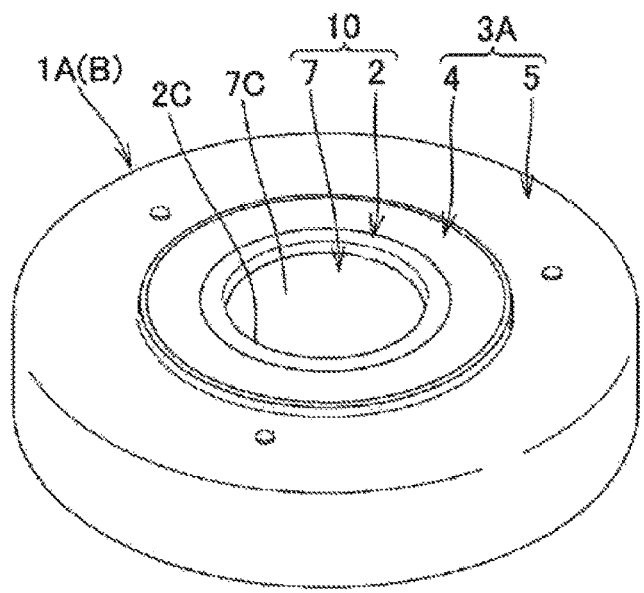
FIG. 4(b) is a perspective view of the state in which a secondary molded article manufactured at a secondary molding step is removed together with the insert core from a secondary molding die.

After cooling the secondary molding die C2 illustrated in FIG. 7(b) and hardening the resin, the secondary molding die C2 is opened and the insert core 7 and the secondary molded article B illustrated in the perspective view of FIG. 4(b) and the vertical cross-sectional view of FIG. 7(c) are removed from the second injection molding machine. The secondary molded article B is formed by integrating the annular external member 5 into the primary molded article A.

<Separation Step>

In the state where the insert core 7 and the secondary molded article B are coupled together as illustrated in the vertical cross-sectional view of FIG. 7(c), the insert core 7 and the secondary molded article B are relatively moved in the axial direction to release the fit between the round shaft 7C of the insert core 7 and the internal hole 2C of the annular sleeve 2 of the secondary molded article B.

Figure 8:
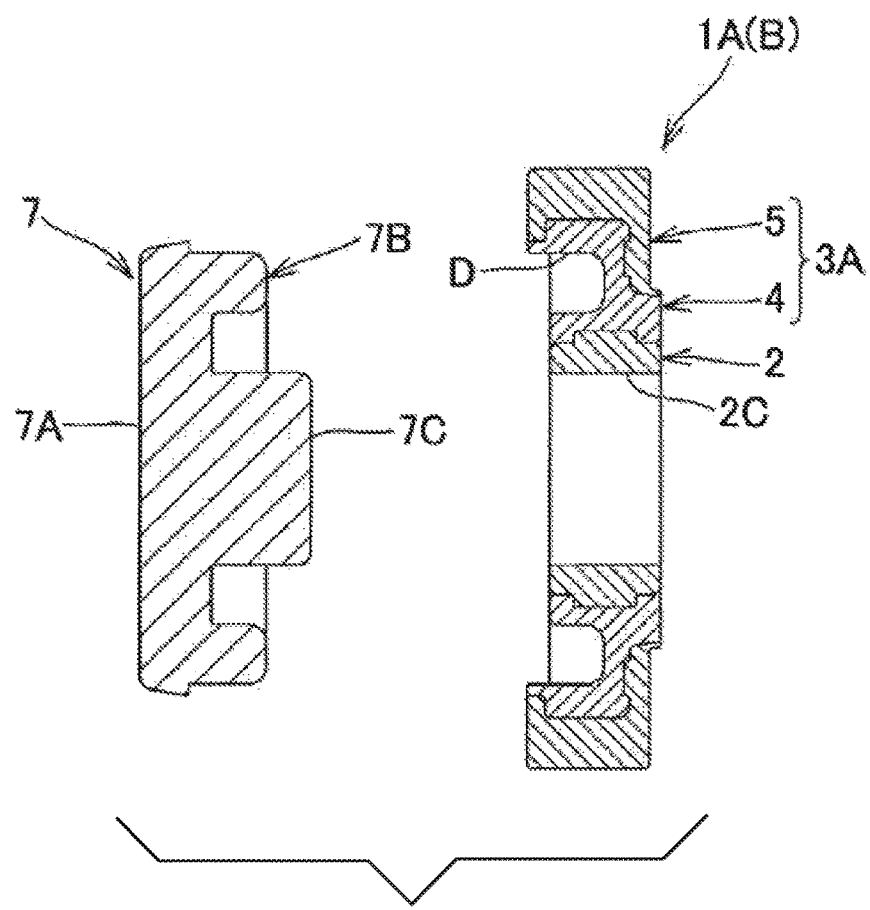
FIG. 8 is a vertical cross-sectional view illustrating the state in which the secondary molded article and the insert core illustrated in FIG. 7(c) are separated from each other.

Accordingly, as illustrated in the vertical cross-sectional view of FIG. 8, the insert core 7 and the resin gear with metallic core 1A before formation of the teeth on the outer peripheral surface as the secondary molded article to engage with another gear are separated from each other.

The thus separated insert core 7 is reused at the coupling step described above.

In the manufacturing method of the resin gear with metallic core 1 as described above, a two-color molding machine as a special molding machine is not used but the first injection molding machine including the primary molding die C1 and the second injection molding machine including the secondary molding die C2 are used for injection molding of the annular tooth part 3A (the annular internal member 4 and the annular external member 5) as the resin part in twice. Accordingly, the use of the general molding machines suppresses increase in introduction cost and provides high versatility to facilitate the fabrication of the dies.

According to the manufacturing method of the resin gear with metallic core 1 as described above, the coupled body 10 formed by concave-convex fitting the insert core 7 into the annular metallic sleeve 2 and coupling the two is used in common at the primary molding step using the primary molding die C1 of the first injection molding machine and at the secondary molding step using the secondary molding die C2 of the second injection molding machine, it is possible to suppress the deformation of the primary molded article A removed from the first injection molding machine after the primary molding step under influence of mold shrinkage and the like.

In addition, since the base body 7A of the insert core 7 used in common at the primary molding step and the secondary molding step is positioned in the primary molding die C1 and the secondary molding die C2, the positioning of the annular sleeve 2 in the primary molding die C1 and the positioning of the primary molded article A in the secondary molding die C2 become easy and reliable.

Accordingly, at the manufacture of the resin gear with metallic core 1 by injection molding of the resin part in twice, it is possible to stabilize mass-production quality and improve yield while suppressing a rise in manufacturing costs partly because the dies can be fabricated without using a special molding machine and the deformation of the primary molded article A under the influence of mold shrinkage and the like can be suppressed.

Further, the annular internal member 4 can be easily provided with thinned portions D as illustrated in FIG. 8 by the axially projecting convex portions 7B in the insert core 7 (see FIGS. 3(c) and 5(b)). The provision of the thinned portions D reduces the weight of the resin gear with metallic core 1. In addition, the molded article becomes smaller in volume to bring about a shorter hardening time. As a result, it is possible to shorten the molding cycle and decrease the amount of shrinkage to suppress sink marks, voids, and others.

Moreover, the convex portions 7B of the insert core 7 are inserted in the thinned portions D formed in the annular internal member 4 at the primary molding step, and the convex portions 7B remain in the thinned portions D until the separation step after the secondary molding step.

Accordingly, it is possible to suppress the deformation of the thinned portions D in the primary molded article A removed from the first injection molding machine after the primary molding step under the influence of mold shrinkage and the like.

The manufacturing method by which the insert core 7 is used in common in the primary molding using the primary molding die C1 and the secondary molding using the secondary molding die C2 is not limited to the manufacture of the resin gear with metallic core 1. The foregoing manufacturing method is also applicable to the manufacturing method of an insert molded article that includes a metallic insert, an inside member made of synthetic resin and covering a portion of the insert, and an outside member made of a synthetic resin different from the material of the inside member and covering a portion of the inside member.

Specifically, the base body of the insert core is provided with a fitting convex portion projecting in a direction toward a portion of the insert not covered by the inside member, the insert is provided with a fitting concave portion to fit to the fitting convex portion at a portion not covered by the inside member, so that the insert core and the insert can be concave-convex fitted to each other to obtain the coupled body. Alternatively, the insert may be provided with a fitting convex portion projecting in a direction toward the base body of the insert core at a portion not covered by the inside member, the base body of the insert core may be provided with a fitting concave portion to fit to the fitting convex portion, so that the insert core and the insert can be concave-convex fitted to each other to obtain the coupled body.

In the foregoing description, two general molding machines, that is, the first injection molding machine including the primary molding die C1 and the second injection molding machine including the secondary molding die C2 are used. However, the present invention is not limited to this configuration. That is, in the case of small-lot production, one injection molding machine may be used to perform the primary molding using the primary molding die C1 and the secondary molding using the secondary molding die C2 while exchanging the dies and the resin materials.

REFERENCE SIGNS LIST

1 Resin gear with metallic core (insert molded article)
1A Resin gear with metallic core before formation of teeth on the outer peripheral surface to engage with another gear
2 Annular sleeve (insert)
2A Base body
2B Tooth-shaped projection
2C Internal hole (fitting concave portion)
3 Annular tooth part
3A Annular tooth part before formation of teeth on the outer peripheral surface to engage with another gear
4 Annular internal member (inside member)
4A Base body
4B Tooth-shaped projection
5 Annular external member (outside member)
6 Teeth
7 Insert core
7A Base body
7B Convex portion
7C Round shaft (fitting convex portion)
8A and 8B Movable die
9A and 9B Fixed die
10 Coupled body
A Primary molded article
B Secondary molded article
C1 Primary molding die
C2 Secondary molding die
D Thinned portion
G1 and G2 Gate

The invention claimed is:

1. A manufacturing method of an insert molded resin gear including:
a metallic insert;
an inside member made of a first synthetic resin and covering a portion of the insert; and
an outside member made of a second synthetic resin different from the material of the inside member and covering a portion of the inside member,
the manufacturing method comprising the steps of:
fitting an insert core into the insert to obtain a coupled body in which the insert and the insert core are coupled together;
performing a primary molding operation by positioning a base body of the insert core in a primary molding die so as to set the coupled body in place in the primary molding die, closing the primary molding die around the coupled body, and injecting the first synthetic resin into a cavity of the primary molding die extending around the coupled body so as to form the inside member, thereby manufacturing a primary molded article in which the inside member is integrated with the insert and extends partly between the outer peripheral surface of the insert and axially projecting convex portions of the insert core;
opening the primary molding die and removing the coupled insert core and the primary molded article therefrom;
performing a secondary molding operation by positioning the base body of the insert core in a secondary molding die so as to set the coupled insert core and the primary molded article in place in the secondary molding die, closing the secondary molding die, and injecting the second synthetic resin into a cavity of the secondary molding die extending around each of the primary molded article and the coupled insert core so as to form the outside member, thereby manufacturing a secondary molded article in which the outside member is integrated with the primary molded article;
opening the secondary molding die and removing the coupled insert core and the secondary molded article therefrom; and
separating the insert core from the secondary molded article.

2. The manufacturing method of the insert molded resin gear according to claim 1, wherein:
the insert is an annular sleeve, the inside member is an annular internal member, the outside member is an annular external member, the insert molded resin gear has a metallic core as the insert and having teeth formed on an outer peripheral surface of the annular external member, and
the base body of the insert core is disc-shaped, and a round shaft in a radially central portion of the base body is fitted into an internal hole of the annular sleeve to form the coupled body.

3. The manufacturing method of the insert molded resin gear according to claim 2, wherein the convex portions of the insert core provide thinned inner portions to the inside member.

4. The manufacturing method of the insert molded resin gear according to claim 1, wherein the convex portions of the insert core provide thinned inner portions to the inside member.

5. The manufacturing method of the insert molded resin gear according to claim 1, wherein the cavity of the secondary molding die extends between a portion of the inside member and a cavity surface of the secondary molding die so that the injected second synthetic material around and into contact with a portion of the insert core.

6. The manufacturing method of the insert molded resin gear according to claim 1, wherein the insert comprises tooth-shaped projections against which the inner member is formed and integrated with the insert.

7. The manufacturing method of the insert molded resin gear according to claim 1, wherein the insert core comprises a round shaft fitted into an internal hole of the insert to form the coupled body, with the axially projecting convex portions extending peripherally around and spaced from the shaft.

8. The manufacturing method of the insert molded resin gear according to claim 1, wherein the outside member has teeth configured to engage with a gear distinct from the resin gear.

9. The manufacturing method of the insert molded resin gear according to claim 8, wherein the outside member teeth are formed by the secondary molding operation.

10. The manufacturing method of the insert molded resin gear according to claim 8, wherein the teeth are formed by a tooth cutting process performed on the outer peripheral surface of the outside member.

* * * * *